United States Patent [19]

Frazen et al.

[11] Patent Number: 5,506,639
[45] Date of Patent: Apr. 9, 1996

[54] METHOD AND APPARATUS FOR EDITING MOTION PICTURE FILM AND SYNCHRONIZED SOUND

[76] Inventors: Nancy E. Frazen, 2020 Rosilla Pl., Los Angeles, Calif. 90046; Gary Jacobson, 1248 S. Fairfax, Los Angeles, Calif. 90019; Roberto Santucci-Filho, 7027 Lakewood, #418, Los Angeles, Calif. 90028; Rick Sparr, 28047 Renee Dr., Agoura Hills, Calif. 91301

[21] Appl. No.: 57,934

[22] Filed: May 7, 1993

[51] Int. Cl.$^6$ ................................. G03B 31/00
[52] U.S. Cl. .............. 352/31; 352/5; 352/12; 352/15; 352/22; 352/25; 360/3; 360/13
[58] Field of Search .................... 358/335, 341, 358/311, 903, 345, 244, 214; 360/3, 13, 14.1, 14.2, 33.1, 48; 352/5, 12, 31, 16, 17, 18, 19, 23, 24, 25; 348/512, 515

[56] References Cited

U.S. PATENT DOCUMENTS

| | | | |
|---|---|---|---|
| 1,843,972 | 2/1932 | Forest | 352/31 |
| 3,047,675 | 7/1962 | Berryhill | 360/3 |
| 3,378,328 | 4/1968 | Custin | 352/31 |
| 3,824,336 | 7/1974 | Gould et al. | 360/3 |
| 3,856,389 | 12/1974 | Gardner | 352/31 |
| 4,208,108 | 6/1980 | Amikura et al. | 360/3 |

FOREIGN PATENT DOCUMENTS 9300608  1/1993  United Kingdom.

*Primary Examiner*—Tommy P. Chin
*Assistant Examiner*—Khoi Truong
*Attorney, Agent, or Firm*—LaRiviere, Grubman & Payne

[57] ABSTRACT

Method and apparatus for applying encoded data on the balance stripe of sound track, the data for providing information for editing an associated film without recording the data on the film. The present invention teaches an apparatus for applying code for synchronizing sound on a single strip of the sound track with an associated film. The apparatus includes a code box for generating the code, which relates the position of the film relative to the sound track. The code box is coupled to an editing flatbed for providing pulses related to the movement of the sound track. A sound module is coupled to the code box for applying the code to the balance stripe.

15 Claims, 16 Drawing Sheets

KEY TO FIG. 7

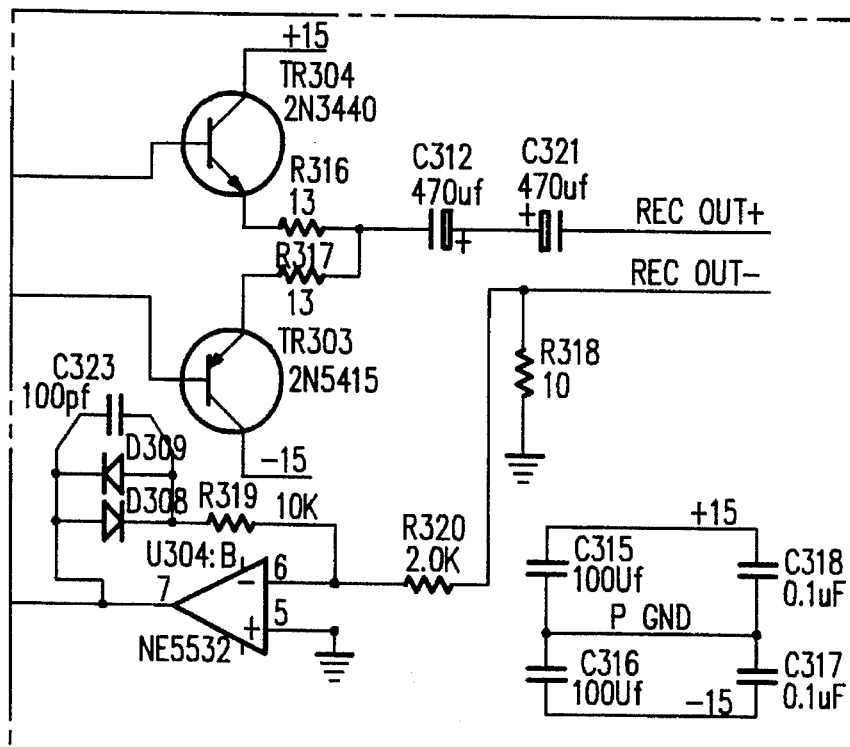
FIG. 8D
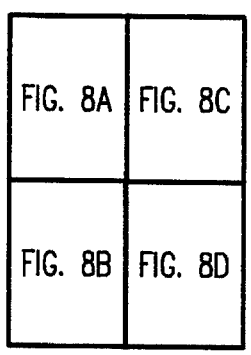
KEY TO FIG. 8

METHOD AND APPARATUS FOR EDITING MOTION PICTURE FILM AND SYNCHRONIZED SOUND

TECHNICAL FIELD

The present invention relates to method and apparatus for editing motion picture film with synchronized sound track. More specifically, the present invention relates to method and apparatus for editing a motion picture film with synchronized sound track by using the balance stripe of a single-stripe magnetic track.

The present invention also relates to method and apparatus for applying, reading and/or erasing data from a balance stripe of a single-stripe magnetic sound track. The present invention further relates to a system and method for editing a sound track by generating coded data which is recorded on a balance stripe for editing the sound track. The present invention also relates to codes used for editing of a motion picture with synchronized sound.

BACKGROUND ART

Film editing is a critical step in creating a motion picture or television production. A principal consideration in editing a sound motion picture production is synchronizing visual images with their associated sound recording. When a scene is filmed, two simultaneous processes are carried out. A visual image is recorded on motion picture film ("film") by a motion picture camera, and dialogue associated with the visual image is magnetically applied on sound track ("track"). Sound track recording is conducted independently of filming, but generally contemporaneously therewith, and on separate recording apparatus.

As filming of each scene is begun, film cameras and sound recording apparatus are activated. A scene's place in a film is recorded and maintained by the use of the well-known clapper board (i.e., clap board, clapsticks, markers, slates or sticks). A clapper board is used for: 1) visually recording a scene and take number (production company, director, date, etc.) by writing the same (electronically, with chalk, etc.) on the clapper board (or any of several devices performing the same function that are known in the art); 2) providing a precise visual synchronization point on a given scene's film; and 3) providing a precise sound synchronization point on the same scene's track. The latter two functions are accomplished simultaneously when the clapper of a clapper board is snapped shut.

In editing a motion picture for public release, a film editor must edit both film and track. A critical feature of editing is the need for continuous alignment or synchronism of dialogue on track with the visual image on the associated film. The various techniques employed by editors for editing include shifting dialogue forward or backward slightly (overlap/prelap) with respect to an associated segment of a scene. These techniques, as well as others, are well-known to those skilled in the motion picture editing art.

Dialogue is typically recorded during the actual filming of a scene. Often music or some other form of sound is recorded separate and apart from filming of a scene. By way of example, special effects, as well as other effects, are often recorded separately from dialogue. Thus, these sound effects must be mixed with dialogue to complete the track. Typically, dialogue, effects and music are recorded on three separate tracks. However, all three can be mixed onto a one track, e.g., a three-stripe magnetic track or a "full-coat" magnetic track.

Editing of film and track is typically conducted on flatbed film editing machines ("flatbeds"), which have been developed for a number of film formats, including the 35 mm format discussed elsewhere herein. Flatbeds are available in several configurations, including those which are capable of running multiple film and multiple tracks simultaneously during editing. A flatbed typically includes at least one picture display, at least one speaker, reels and controls for moving film and track at various speeds, transducers for reading information contained on film or track, as well as marking and cutting devices as required for movie editing. One such well-known flatbed is the KEM machine.

To facilitate film editing, code numbers are mechanically imprinted every sixteen frames (i.e., one foot on 35 mm movie film) along one edge of film by an editor after the film has been developed. These same numbers are also mechanically imprinted on the track, but only after the recorded sound has been transferred from ¼ inch magnetic tape used during the filming process to a single-stripe magnetic track (explained elsewhere herein) having perforations ("sprocket holes") corresponding to 35 mm film. The code numbers on the magnetic track correspond to the numbers on the film in the scene at precisely the same point.

Code numbers serve to identify a film's scene number. When used during editing, code numbers indicate the distance from the previously recorded synchronization point as an aid to the editor in finding proper locations for editing. A system of code numbers which is used substantially throughout the film industry is the code imprinted on film and track by the Acmade® Coding machine, namely, Acmade® code.

Acmade® code has seven or eight characters. The first three digits of the Acmade® code are for scene numbers. A fourth digit is for characters A–E, M, W, P, 1 or blank, which can be used for identifying cameras, music, sound effects, etc. Also, the fourth digit can be used to designate "wild" sound or "wild" tracks. A "wild" track is sound that is recorded without corresponding picture (i.e., thoughts, recall, off-screen dialog, background sound, etc.). The remaining four digits are for current footage in feet from a start mark. Acmade ® code does not provide information for individual frames and/or fractions thereof. A fuller description of coding can be found in Balmuth, Bernard, "Introduction to Film Editing," Focal Press, 1989, ISBN 0-240-51717-2.

Before film editing can begin, synchronism between film and associated track must be initially achieved by matching the first frame of the film (when the clapper closes) with the first modulation of sound (caused by the clapper closing) on track. A synchronizer is a machine known in the art for this purpose. Once synchronism (sync) is achieved, the code numbers previously imprinted along an edge of film are likewise imprinted along an edge of track in the same registration as film. By referring back to code numbers during editing, an editor can approximate those positions on film and track where desired cuts are to be made. This is accomplished by counting forward or backward a given number of frames from the closest Acmade® code number.

In the past, a film editor was expected to synchronize dialogue on track with scenes on film by judging the action on film with dialogue on an associated track. An editor would accomplish this task by referring back to Acmade® code numbers, imprinted every foot along the edges of film and track to estimate proper positions on them for editing. The correct position for editing the track must be estimated because, unlike film, track is not visually differentiated into frames.

In the motion picture arts, dialogue is often mixed (dubbed) with sound effects and music after the editing is completed. This dubbing complicated the previously discussed problem of synchrony between picture and sound. Film must be in synchrony with track before and after dubbing. In the motion picture arts, track used for dubbing is called a one-to-one track. A one-to-one track is used for combining or dubbing dialog, music and sound effects from each of their respective original recordings. Additionally, when dialogue, effects and/or music are dubbed onto a full-coat magnetic track, it is incumbent upon an editor to synchronize the information on that track with associated film. In the past, the editor performed this task in a trial and error manner as previously described.

This trial and error process lacks precision and is very time consuming. In the past, there was no practical, convenient means to precisely synchronize track with film images on a frame-by-frame basis while cutting and splicing track and film during editing. A means whereby track and film could be maintained in synchronism throughout editing would obviate the need for the trial and error re-synchronization process of the prior art. Moreover, by removing the burden for this iterative trial and error re-synchronization between film and track during editing, significant time and cost savings would necessarily accrue.

Some of the problems associated with traditional film editing as previously discussed were alleviated with the advent of videotape technology. Videotape editing provided significant cost reductions over earlier practice. Prior to videotape, initial editing was done directly on film as previously discussed. Videotape editing technology enables a high degree of automation to be applied to editing. Using well-known videotape recording systems (VHS, Telecine, Rank-Cintel, among others) film and track are copied to videotape. These taped images and dialogue are then edited electronically.

Currently available videotape editing systems include recording and playback machines, video inserters, monitors, address generators, keyboard control consoles and associated electronics. This equipment enables an editor to repeatedly try an edited version of a scene until the desired effect is achieved. As all image transfers are accomplished electronically, videotape is not actually cut or spliced, and significant convenience and editing economies are thereby achieved. Videotape technology can record simultaneously on videotape a given film's visual image, dialogue of the film's synchronized track and videotape addresses generated by the videotape editing system. These videotape addresses are subsequently used for editing the videotape.

Rather than actually physically cutting videotape for editing, the data recorded thereon is electronically manipulated. As is well-known in the art, as an editor makes editing "cuts" in videotape, "cut" data or addresses are stored, typically by video recorder/player. When an edited videotape version of a scene has been completed, the videotape address for each required cut is written to an edit decision list. This edit decision list is then used as the basis for editing one version of videotape.

The ability to electronically edit videotape as previously discussed does not enable film and track to be likewise edited with a high degree of automation. Film and track must be cut and spliced as previously described to reflect the editing previously done on the videotape version of the scene. Therefore, when an editor has completed editing on videotape, the edit decision list cannot be used to edit film and track. There is no convenient means for transferring addresses associated with videotape back to film and track for editing.

The videotape frame addresses do not refer to film frames and are therefore of no utility in film editing. For example, once videotape editing is completed, there is no means (other than the trial and error visual and sound process previously discussed) to synchronize dialogue on track with images on an associated film on a frame by frame basis. Further, videotape is generally recorded at 30 frames per second while film is photographed at 24 frames per second (90 feet per minute). The difference between the recording rates of track and film on one hand and videotape on the other cause videotape reference addresses to be unusable for editing film and track.

Therefore, the editor must visually locate the corresponding scene on film based on the video image, and find the closest Acmade® code which was imprinted on the film and track. Film and track are then cut and spliced, referring to the Acmade® code numbers imprinted on both. To accomplish this, the editor visually locates a specified Acmade® code on both the film and track. This Acmade® code provides a rough location for the required cuts (recalling that Acmade® code is imprinted only once per foot of film and track). An editor must precisely locate the given film frame and its associated track section using the flatbed to synchronize the dialogue on track with images on film, in the manner previously discussed herein. Once the exact location for a given cut is found, the splice is finally effected in a manner well-known in the art. Again, this iterative process must be repeated for every edit cut in a given motion picture.

Efforts by other inventors have resulted in several methods, products and apparatus for encoding frame data for editing film. While extremely useful for film editing, they do not address the more complex problem of locating, on a separate and otherwise undifferentiated medium (i.e., track), an exact location for making an edit cut with respect to its corresponding location on film.

In current practice, commercial motion pictures are typically initially filmed on 35 mm motion picture film. This well-known photographic medium consists of a transparent flexible substrate (such as acetate or plastic), 35 mm wide, having a row of rectangular perforations ("sprocket holes") with dimensions of approximately 2×3 mm equally spaced approximately 3 mm apart and disposed continuously 2 mm from each edge of film for providing four sprocket holes on each side per frame ("four-sprocket frame"). Film substrate is typically coated with one of several well known photographic emulsions for recording visual images.

The physical dimensions of track's flexible substrate is similar to 35 mm motion picture film. For editing, a single-stripe magnetic track is used. However, in place of photographic emulsion, single-stripe magnetic track has two stripes of magnetic recording material suitably disposed thereon.

One stripe (a "sound track" or "single stripe") is actually used to record dialogue of a scene being filmed, and is typically 8 mm in width. Another stripe, (a "balancing band" or "balance stripe"), is typically 5 mm wide.

The track's single stripe is not positioned centrally on its substrate in order to properly align the single stripe with the sound recording head currently in use. Because the single stripe is positioned off-center on substrate, long coils of track on reels become mechanically unstable. This is due to the thickness of magnetic recording material added to substrate. An unstable roll would tend to become uncoiled during editing, especially from the open reels in common use. Also, level contact with a sound head provides the best quality of sound recording. To maintain level contact and to mechanically stabilize the roll, the balance stripe is used. For these reasons, and as the name implies, a balance stripe (which is identical in thickness and composition to single stripe) is applied to track.

DISCLOSURE OF INVENTION

The present invention relates to applying data on a balance stripe of track. In the preferred embodiment, data is applied on a balance stripe in the form of code. While the present invention discloses one format for such a code, forms of code other than the precise format as disclosed herein may be used in practicing the art as suggested by the present invention. The code as applied to a balance stripe, provides information for precise synchronism between action on film and sound on an associated track.

The code applied to a balance stripe of track also may be applied to a videotape. In turn, this allows videotape to provide for an approximate temporal correspondence between film and associated track.

In the system of editing film and associated track according to the present invention a variety of elements are disclosed herein. Such devices include a flatbed, optionally a video recorder/player, a code box, an output display, an input means, and optionally, a computer. Code is applied to a balance stripe of a track, and optionally, a channel of a videotape. Videotape also may have recorded thereon data and information contained on film and associated track. Additionally, the code recorded on the balance stripe according to the present invention may be recorded on a one-to-one track for mixing.

Other features of the present invention are disclosed or apparent in the section entitled "Best Mode for Carrying Out the Invention."

BRIEF DESCRIPTION OF DRAWINGS

For fuller understanding of the present invention, reference is made to the accompanying drawing in the following detailed description of the Best Mode for Carrying Out the Invention section. In the drawing.

Figure 1:
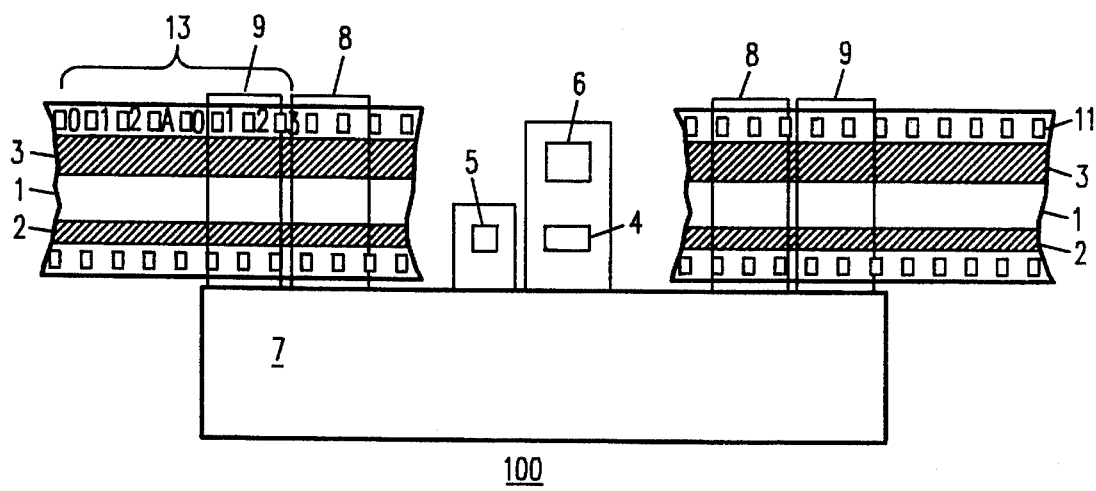
FIG. 1 shows a sound module according to the present invention and a cutaway view of a track.

Reference numbers refer to the same or equivalent parts of the present invention throughout the several figures of the drawing.

BEST MODE FOR CARRYING OUT THE INVENTION

In the present invention, a method of applying data on a balance stripe of a track is provided. The present invention also includes a method of applying and reading data on a balance stripe of a track. The present invention further provides an apparatus for applying positioning data related to positioning of film relative to frames of an associated track. Positioning data is in code format.

The present invention also provides systems for editing film and associated track. The present invention further teaches a method for generating positioning data related to positioning of a track relative to frames of an associated film, and a method for generating positioning data related to positioning of a film relative to frames of an associated track and for applying positioning data on a balance stripe of track. The present invention further teaches a method for editing, by a user, of film, having frames and an associated track, wherein track has a single stripe and a balance stripe. The present invention further teaches a system for editing film and associated track, wherein film has frames and associated frame code numbers and track has a single stripe and a balance stripe. The present invention also teaches a method for editing film and associated track by a user, wherein film has frames and associated frame code numbers, and track has a single stripe and a balance stripe.

SOUND MODULE

Referring to FIG. 1, sound module 100 (e.g., a KEM sound module) and a track 1 are shown. Sound module 100 comprises transducers 4–6 (e.g., transducer 4 is a recording/playback sound head, transducer 5 is an erase head, and transducer 6 is a playback sound head), flywheels 9, guide rollers 8, and sound module circuitry 7. Track 1 is shown as a breakaway view in order to more clearly expose transducers 4–6. Track 1 should however be thought of as a continuous strip. Track 1 comprises balance stripe 2, single stripe 3, code 13 (e.g., Acmade® code) and sprocket holes 11. Transducer 4 is a recording/playback head for recording (also referred to as applying or writing) on and playing back (also referred to as reading) from balance stripe 2. Transducer 6 is a playback sound head for reading single stripe 3. Transducer 5 is an erase head for erasing balance stripe 2. Optionally, transducer 5 may be omitted. Rather than erasing balance stripe 2 to insure accurate records thereon, balance stripe 2 may be recorded on in an over saturated manner as is known in the art. However, this can cause "bleeding" to other tracks, including bleeding through the substrate. Also, use of transducer 5 may be omitted if balance stripe 2 likely contains no other recording.

Data is applied to and read from balance stripe 2. Data is first transmitted to transducer 4, and then as track 1 passes in near proximity to transducer 4, data may be applied to balance stripe 2 therein. In the preferred embodiment of the present invention, track 1 is a flexible plastic substrate. A flexible substrate in the preferred embodiment of the present invention happens to be ostensibly transparent; however, it should be understood that other types of substrates can be used in practicing the art as taught by the present invention. Suitably positioned on the flexible substrate are two stripes of magnetically recordable media, namely, single stripe 3 and balance stripe 2. As is known in the art of the present invention, single stripe 3 is often referred to as the dialogue track or sound track. It should be understood that, while transducers 4–6 in the present invention convert electrical energy to magnetic energy for applying, reading and erasing data from balance stripe 2 and single stripe 3, other means well-known in the art of the present invention may be used. By way of example and not limitation, track 1 may have optically active stripes for recording and reading, and transducers 4–6 may be optically active devices for applying, reading and erasing data.

As shown in FIG. 1, transducers 4 and 6 are in vertical parallel with one another, and transducers 4 and 5 are in horizontal parallel with one another. Additionally, transducer 5 is perpendicular to transducers 4 and 6, and there is a gap between transducer 5 and transducers 4 and 6. While it should be understood, that the physical proximity of transducers 4–6 for the preferred embodiment of the present invention are substantially as shown in FIG. 1, it should also be understood that transducers 4–6 may be reoriented as long as they are in near proximity to single stripe 3 and balance stripe 2.

As discussed elsewhere in this specification, data is applied to and read from balance stripe 2. Any type of data can be applied to and read from balance stripe 2. However, the present invention further particularly discloses a type of coded data which is used in the preferred embodiment herein.

Figure 2:
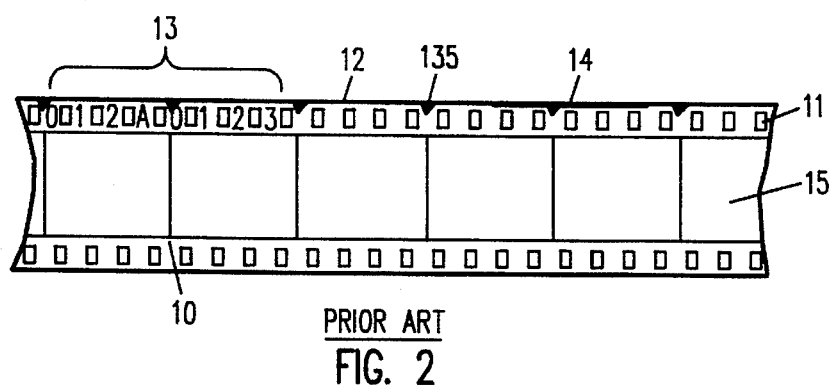
FIG. 2 shows film coded according to industry standards.

In the preferred embodiment of the present invention, data applied to and read from balance stripe 2 relates to the position of track 1 relative to picture frames 15 of film 12 as shown in FIG. 2. Film 12 comprises picture frames 15, framelines 10, frame markers 135, sprocket holes 11 (substantially similar to sprocket holes 11 of track 1), code 13 (e.g., Acmade® code), and key number 14 (e.g., Eastman key number).

As is known, code 13 is printed onto film 12 and stamped onto track 1 for each foot from the start mark of the first scene on a roll. As multiple scenes and takes may be shot on one roll or reel, an editor must prepare the "dailies" for synchronization of film with track as is known in the art of the present invention. However, for the first time, not only may the distance from a scene's start mark be expressed in feet, but also with the present invention, the distance may be expressed in frames and fractions of a frame, as explained elsewhere herein. Moreover, because code is applied to balance stripe 2, it should be apparent to those with ordinary skill in the art that a synchronizer may be substantially eliminated from a process of editing film to track. Also, it will become apparent that track may be, but need not be, stamped with code in accordance with the present invention, as code is recorded on balance stripe 2.

CODE BOX

Figure 3:
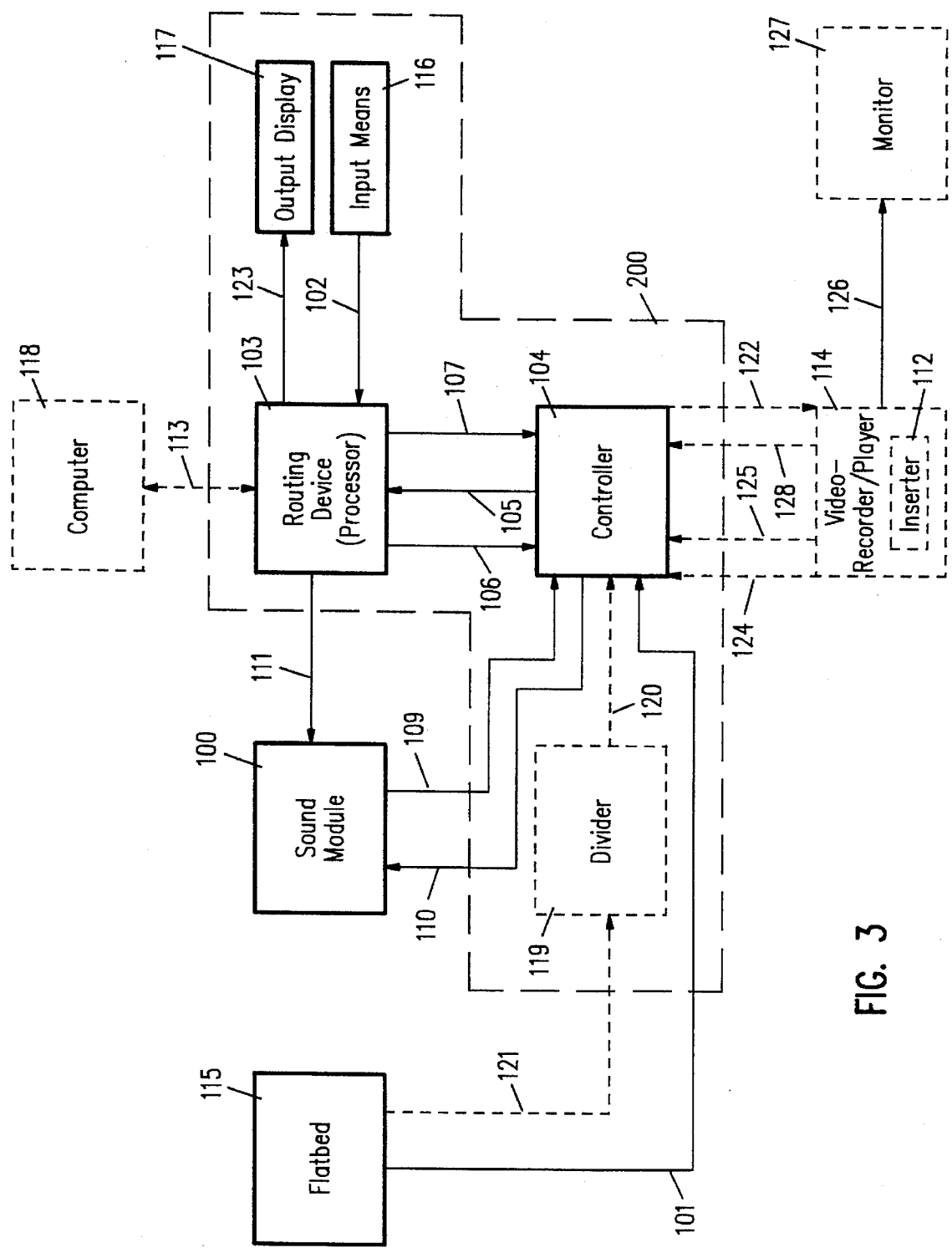
FIG. 3 is a block diagram of a code box according to the present invention.

Referring to FIG. 3, a block diagram of code box 200 is shown. Code box 200 comprises processor 103 and controller 104. Optionally, code box 200 may include divider 119, input means 116 and output display 117.

Output display 117 may be part of code box 200 or be coupled external to code box 200. However, in the preferred embodiment of the present invention, output display 117 is part of code box 200. Moreover, in the preferred embodiment of the present invention, output display 117 is a liquid crystal display (LCD) 214 and two light emitting diodes (LEDs) 212 and 213. Other output means for display 117 as are well-known may alternatively be used with the present invention, such means include CRTs, monitors, plasma screens, LED and optical displays. In the preferred embodiment, LCD 214 is a 2 line by 16 character display, LED 212 is green, and LED 213 is red.

SET CODE

An operator aligns film 12 and track 1 for synchrony. This is accomplished by aligning the clapper modulation on track with the visual closing of the clapper as shown on a frame 15 of film 12. As is known in the art, the alignment of start marks is measured from one to one-and-one half feet back from the actual start marks. A leader may be used for this purpose.

Figure 4:
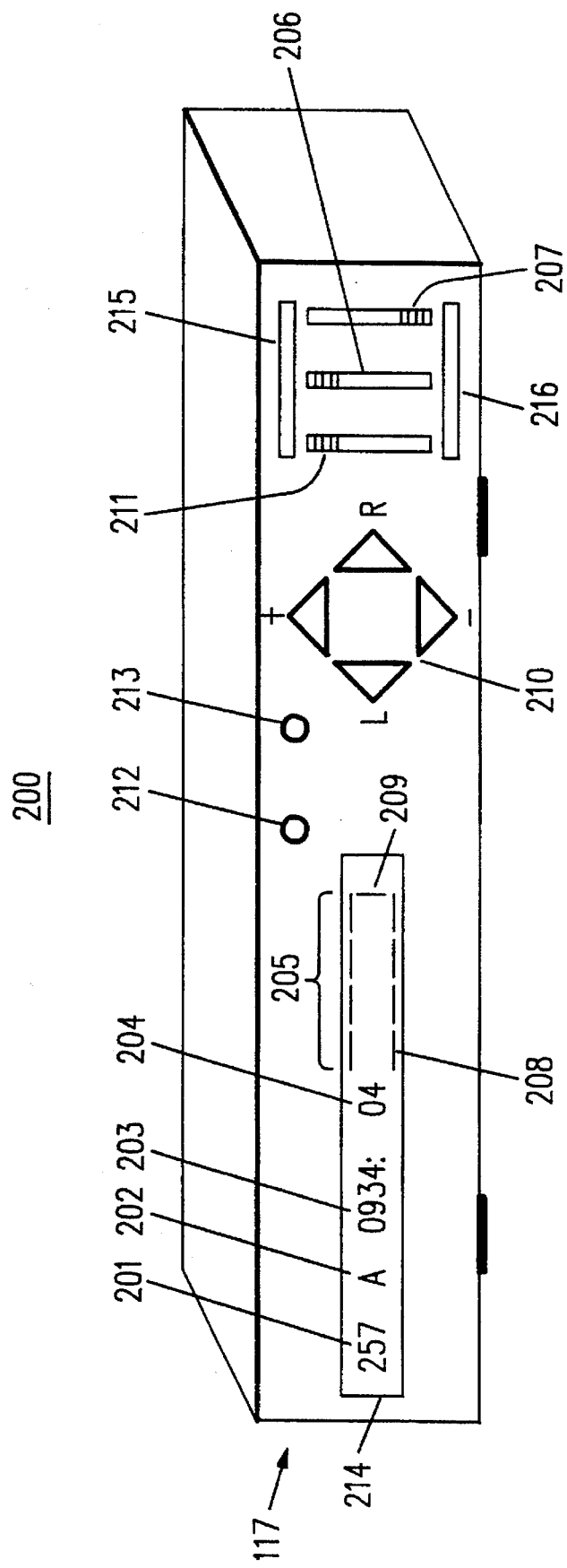
FIG. 4 shows a code box, front panel display according to the present invention.

A first code number is input through input means 116. Input means 116 can be various well-known means for inputting data. In the preferred embodiment of the present invention, input means 116 is an array of four electronic buttons 210, two toggle switches, 206 and 207, and a momentary record switch 211 as shown in FIG. 4. However, various other well-known means can be used in practicing the art as taught by the present invention. By way of example but not limitation, input means 116 may be a computer keyboard, a mouse, a trackball, a data pad, a graphics pad, an optical wand, a barcode reader, a character recognition reader, a voice input recognition device or various other means well-known in the art of the present invention. Moreover, in the preferred embodiment, input means 116 is incorporated as part of code box 200.

Input means 116 is coupled to controller 103. Controller 103 may comprise various elements well-known in the art of the present invention. Controller 103 includes a microprocessor, random access memory, erasable programmable read-only memory, timers, pulse generators, and a serial interface. However, it should be understood that many implementations of controller 103 are possible in accordance with the teachings of the present invention herein. By way of example, and not limitation, controller 103 may include electronically erasable programmable read-only memory, other types of random access memories (static and/or dynamic), timing circuits, parallel interface, other forms of pulse generators (e.g., monostable multivibrator), microcontroller, PLAs, PALs, other implementations of flip-flops and/or logic gates as well as a variety of other components which are well-known in the art of the present invention.

A first code number is entered with input means 116. A first signal corresponding to a first code number is sent to controller 103, along signal path 102. From which controller 103 sends a control signal to routing device 104 along signal path 107. Flatbed 115 must be started in order to provide quadrature pulses along signal path 101 or 121 via routing device 104 and signal path 105, to controller 103 for incrementing or decrementing a first code number. The first code number is also to enable controller 103 for generating sequential code numbers in accordance with code and quadrature pulses as received.

The control signal enables routing device 104 for receiving code pulses along signal path 106 from controller 103. Routing device 104 comprises a 74HC22106 integrated circuit in the preferred embodiment; however, other means well-known in the art may be used.

In the preferred embodiment of the present invention, output display will display a current position within one-twentieth of a frame, as seen in FIG. 4 and described elsewhere herein. With a proper initial code entered through input means 116, a record signal is sent to controller 103 from input means 116 through signal path 102. Upon receipt of which, controller 103 begins generating code pulses along signal path 106 to routing device 104. The record signal may also be generated electronically for automatic generation of code pulses for recording to balance stripe 2. For example, quadrature pulses from the KEM can be read to determine a proper recording speed has been achieved, and thus initiate recording. However, in the preferred embodiment of the present invention, a momentary record switch is pressed by an operator when near or at recording speed.

Once aligned, track 1 is passed in near proximity to sound module 100. It is important to note that flatbed reels, as mentioned elsewhere in this specification, are operating at a speed for recording on track 1, namely, 24 frames 15 per second. This may require a certain amount of track 1 to be lead in prior to recording on balance stripe 2. Recording begins once track 1 is at proper recording speed. Second signal from input means 116 along path 102 is entered by means of momentary record switch. The record signal causes controller 103 to enable sound module along signal path 111 for recording code pulse on balance stripe 2. Routing device 104 routes code pulses from controller 103 along signal path 106 to sound module 100 along signal path 110. Sound module 100 records code pulses on balance stripe 2.

Flatbed 115 comprises a sound module 100. Transducer 4 is for applying code to balance stripe 2 as generated by controller 103 in the form of code pulses. Additionally, in the present invention code or other information or data can be applied to balance stripe 2.

In the preferred embodiment of the present invention, code pulses are generated by a software phase lock loop. Code is stored in an 80 bit per frame Manchester code. Code box 200 reads quadrature pulses from flatbed 115, and multiplies quadrature pulse frequency by 16, and thus removes wow and flutter inherent in flatbeds.

In this manner, track 1 is completely unwound from a reel for applying code to balance stripe 2. This causes all required code numbers to be applied to balance stripe 2. Notably, a KEM flatbed is used in the preferred embodiment of the present invention. As KEM sound modules usually have only one head or transducer for playback, transducer 5 may be enabled with transducer 4 via controller 103. Code as sent to transducer 4 may be recorded after erasing balance stripe 2 with transducer 5, may be recorded without erasing, or may be recorded without transducer 5.

The present invention teaches herein that code box 200 and sound module 100 can be implemented in operative combination. While a single-stripe magnetic track is not used for original sound recording, a sound recording apparatus used in making motion pictures may have a code box 200 for applying code simultaneously with recording a motion picture's dialogue. For example, a separate channel or band could be defined on the ¼ inch original track for recording code. As is known, however, the original ¼ inch track is presently recorded on single strip 3 for editing to film.

FLATBED

In the preferred embodiment of the present invention, in order to synchronize and generate code pulses for application to balance stripe 2, counter pulses or quadrature pulses from flatbed 115 are used. Quadrature pulses relate to track 1 movement as mechanically rotated with a motor drive 404 of flatbed 115 in combination with sprocketed cylinders 108. Sprocketed cylinders 108 comprise sprockets for mechanically meshing with sprocket holes 11. This meshing of sprockets to sprocket holes allows track 1 to be moved past transducers 4–6 in a known electro-mechanically controlled manner. Quadrature pulses indicate to code box 200 both speed and direction of movement of track 1.

Quadrature pulses from flatbed 115 are sent along signal path 101 to routing device 104. Signal path 101 receives relatively ten quadrature pulses per frame 15 of film 12. These ten quadrature pulses per frame are from a frame interface counter on flatbed 115. However, motor drive of flatbed 115 provides fifty quadrature pulses per frame 15 of film 12. Therefore, rather than signal path 101, fifty quadrature pulses per frame may be optionally coupled through signal path 121 to divider 119. Divider 119 divides by five these fifty quadrature pulses per frame. Thus, ten quadrature pulses per frame 15 from divider 119 would be delivered along signal path 120 to routing device 104.

It also should be understood that controller 103 uses quadrature pulses to extrapolate the current position of film when movement of the track occurs at a speed or direction not capable of being read by code box 200. Additionally, quadrature pulses are also used to determine whether or not code is being applied to videotape 400 (explained elsewhere herein) at a proper speed. Code box 200 in the preferred embodiment, stops recording when the quadrature pulses are too slow or too fast.

VIDEOTAPE

Figure 6:
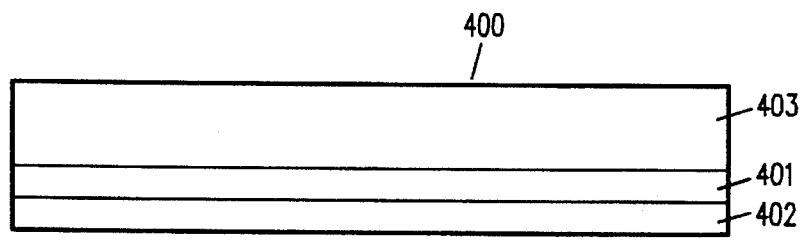
FIG. 6 shows a section of videotape.

The actual recording of film 12 on videotape 400, a form of which is shown in FIG. 6, is known in the art of the present invention, and is omitted here in order to prevent unnecessary obscuring of the present invention. It is also well-known in the art of the present invention, to record data from track, e.g., single stripe 3, on videotape 400. Therefore, in order to prevent unnecessary obscuring of the present invention, specific details of that recording will not be discussed in full detail.

As explained above, flatbed 115, as enabled, passes balance stripe 2 of track 1 in near proximity to transducer 4 for recording. Code pulses being recorded on balance stripe 2 may be simultaneously sent along signal path 106 to routing device 104. Routing device 104 then routes code pulses along path 122 to video recorder/player 114. Video recorder/player 114 may be a video cassette recorder, a video tape recorder, or some other form of recording means well-known in the art. Moreover, an electromagnetic, optical, mechanical, electrical, electro-optic, or other form of well-known recording device may be used. In the preferred embodiment, a SONY VCR deck is used.

In the preferred embodiment of the present invention, code pulses as sent along path 122 are ultimately recorded by video recorder 114 on a designated track on a videotape 400 residing therein. Videotape 400, for example, includes ¾ inch, 8 mm and other forms known in the art. It also should be understood that various video disk, compact disc, and magnetic disc, among others known in the art, may be used with the present invention. In the preferred embodiment of the present invention, this designated track is known in the art as channel 2. It should be understood that in the art of the present invention, videotape 400 as shown in FIG. 6 typically comprises at least three tracks: a picture track 403, a channel 1 audio track 401, and a channel 2 audio track 402. It also should be understood in the art of the present invention that it is possible to switch recording of code pulses between channel 401 and channel 402 such that either channel can be used for recording same. Additionally, any available track that can sync dialog to picture may be used, including address track or VITC as is known in the art. In the preferred embodiment of the present invention, code box 200 is coupled to input and output of channel 2 of video reorder/player 114.

It should be noted that, in the past, particular addresses for editing videotape 400 as recorded with information from track 1 were used for editing the videotape. However, with the present invention as applied to a videotape 400 residing in video recorder/player 114 may now replace or be used in combination with such addresses. Code applied to balance stripe 2 is preferred over prior art video tape addresses. Videotape operates on different modulation principles than that of film; 35 mm film operates at 24 picture frames per second, whereas videotape operates at 30 frames per second. Thus, videotape addresses are not directly useful to identify locations for cutting a film 12 and track 1. However, as code can be recorded from balance stripe 2 to a desired channel on a videotape in time with actual track recording, code numbers according to the present invention may be used to determine approximate actual cutting locations on a film 12 and track 1 as recorded on videotape 400. Code pulses are recorded on videotape 400 at the speed of 24 picture frames per second, the same as for the balance stripe. Thus, code is recorded on videotape 400 independent of the video recording speed of video recorder/player 114. Moreover, code of the present invention may be read by many readers and video character inserters. These readers include time code readers, e.g., SMPTE readers.

Once data or information from film 12 and track 1 are recorded on videotape 400, an editor can determine what information needs to be removed from the final product. This is accomplished with an edit decision list. It is presently known in the art that specified addresses on videotape indicate locations for beginning cutting and ending cutting of sections on a videotape. Wherein a second videotape recorder can be used to record a complete version without edits to get a full effect of the edited product, without physically cutting videotape. In this process, code according to the present invention is also edited as residing on videotape 400. Code values accurately reflect corresponding track 1 and film 12 locations. An editor, by using these code values can accurately cut and splice film and associated track.

It should be understood that code recorded on balance stripe 2 and videotape 400 can be used for creating an edit decision list for film 12 and track 1. For example, an edit decision list prepared from code of the present invention would directly provide edit locations. Edit locations may be included on a recorded edit decision list or directly displayed on a videotape output device. Even though, there may be some loss of correspondence due to the difference between 30 and 24 frames per second, an editor will at least have some idea of where edits were made.

COMPUTER

It should also be understood that controller 103 can be optionally coupled to a computer 118. Such coupling is well-known in the art, including both serial and parallel devices. In the preferred embodiment, an RS-232 serial interface is used. Computer 118 can be used for storing information simultaneously with either code generation or during a playback mode of operation. Additionally, an edit decision list may be automatically made by a computer, as read from code applied to videotape 400 in combination with or without videotape addresses.

SYSTEM

Figure 5:
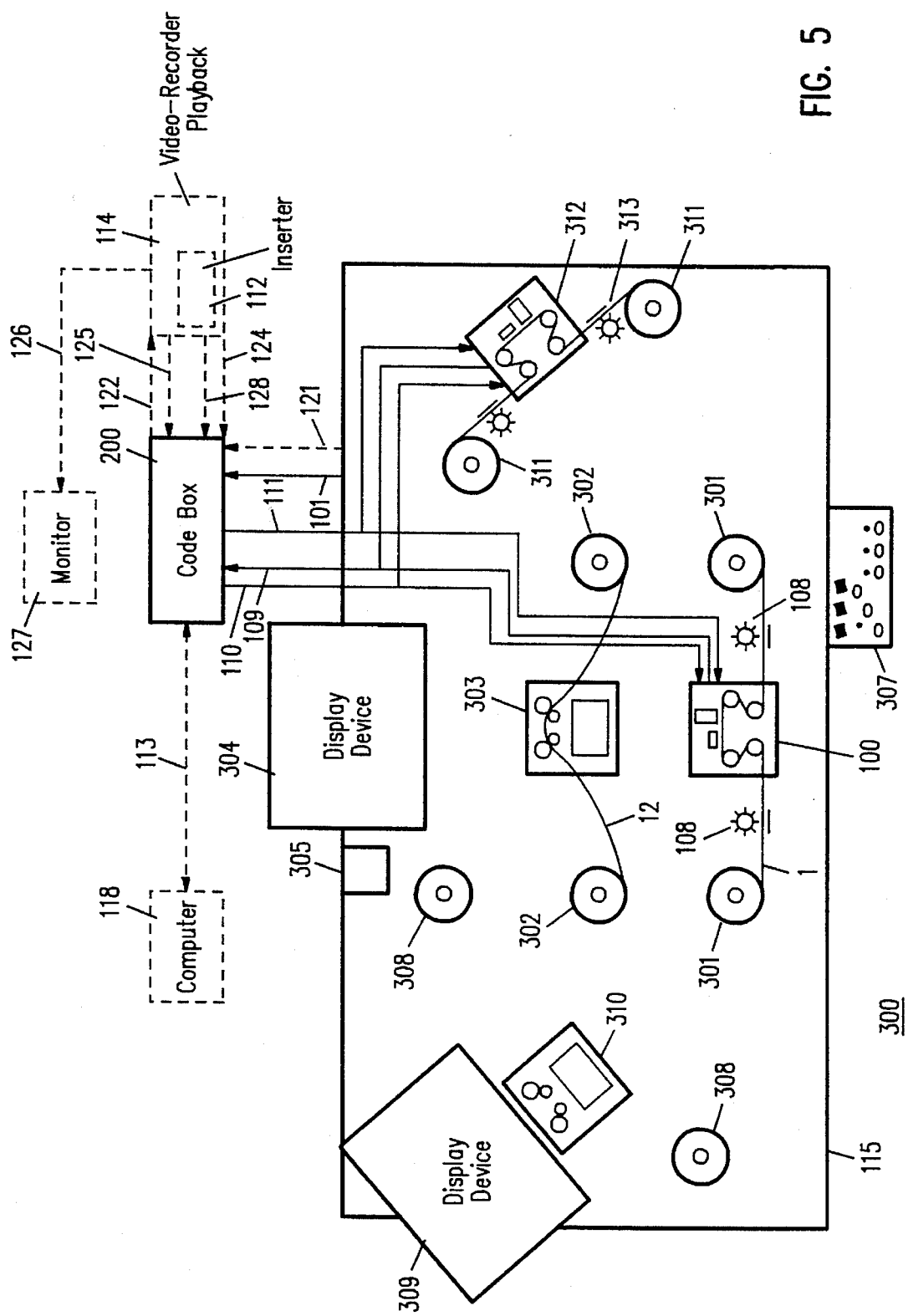
FIG. 5 is a block diagram of a film and track editing system according to the present invention.
Figure 7A:
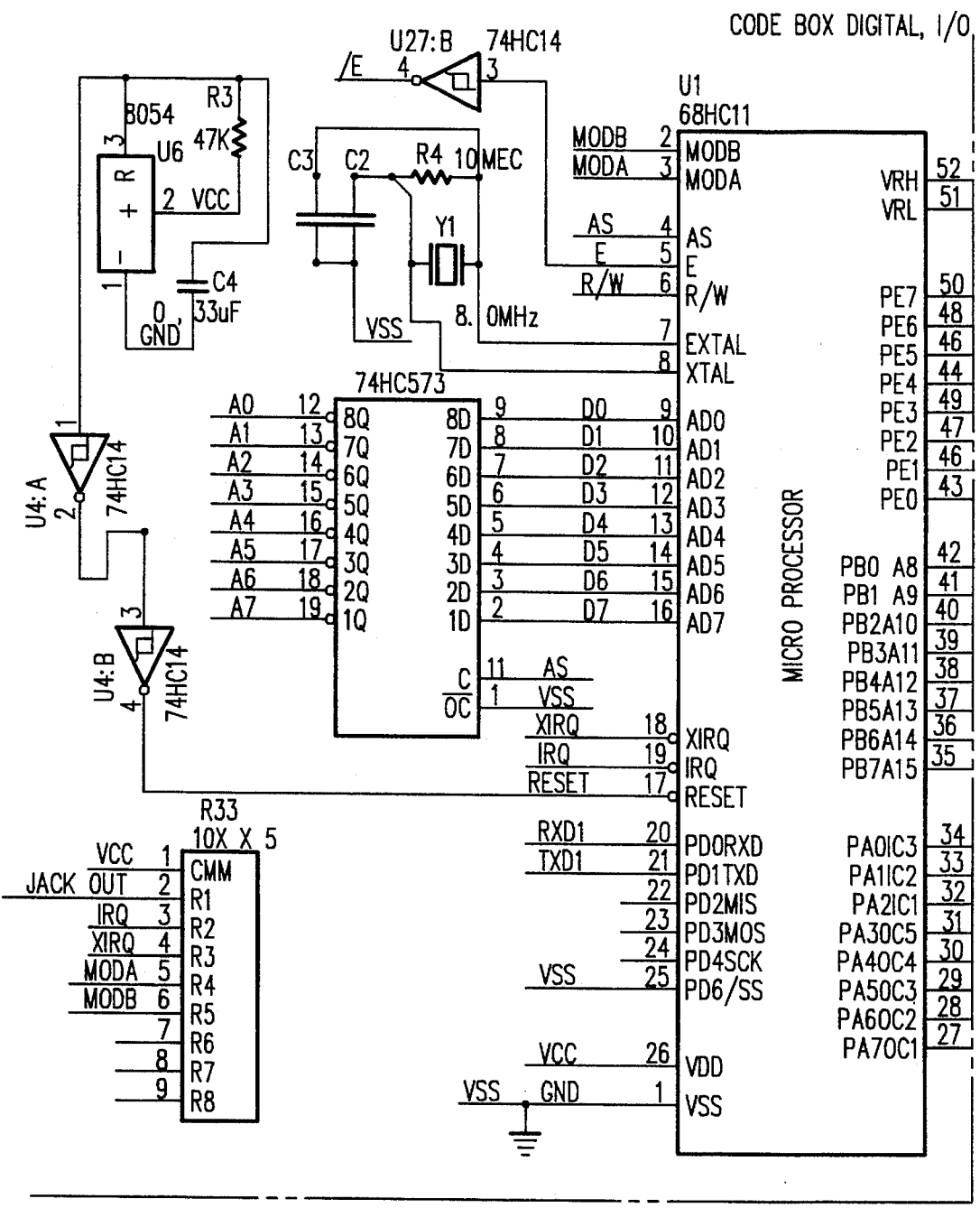
FIGS. 7 and 8 are circuit diagrams for a code box according to the present invention.
Figure 7B:
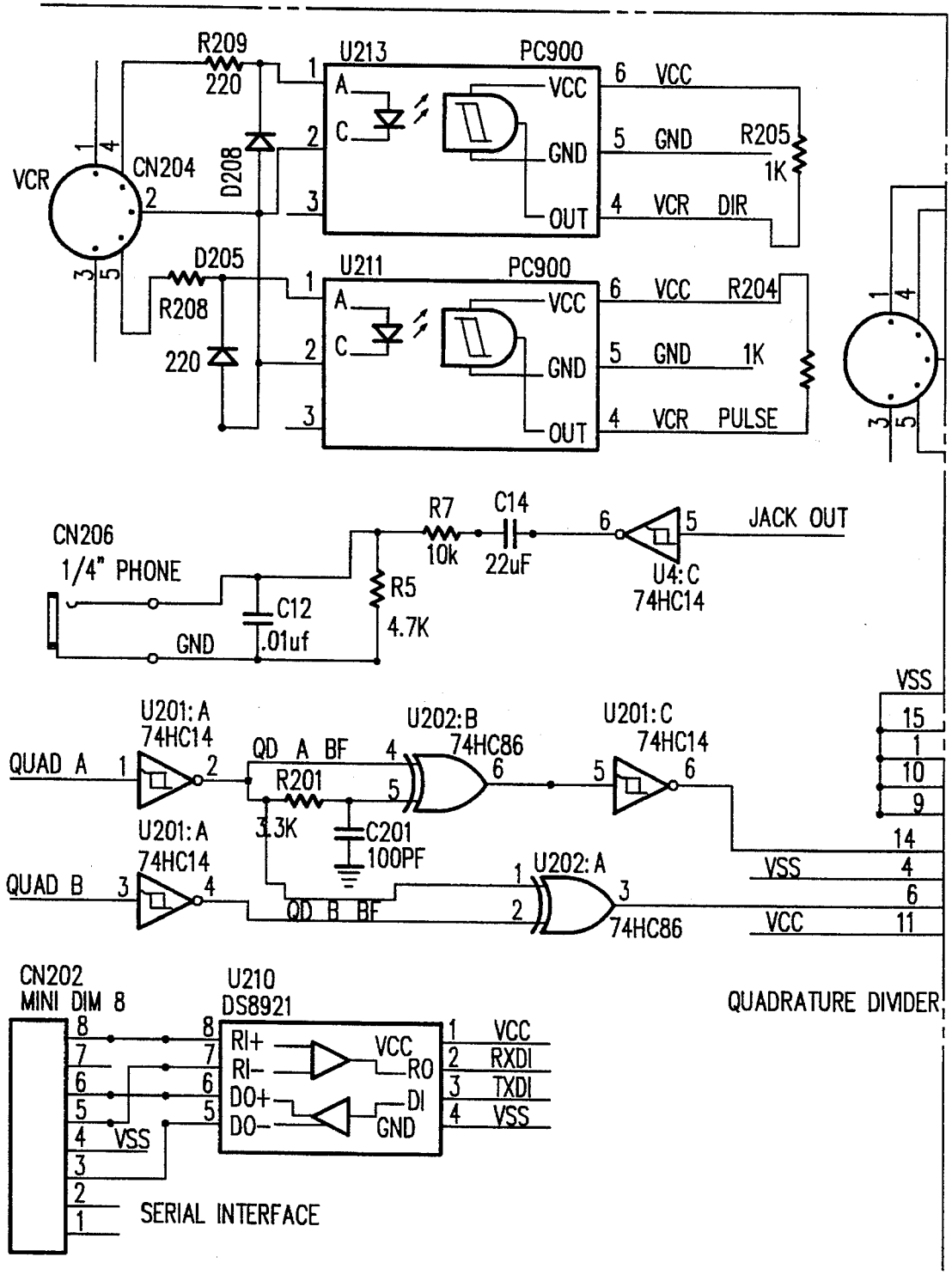
Figure 7C:
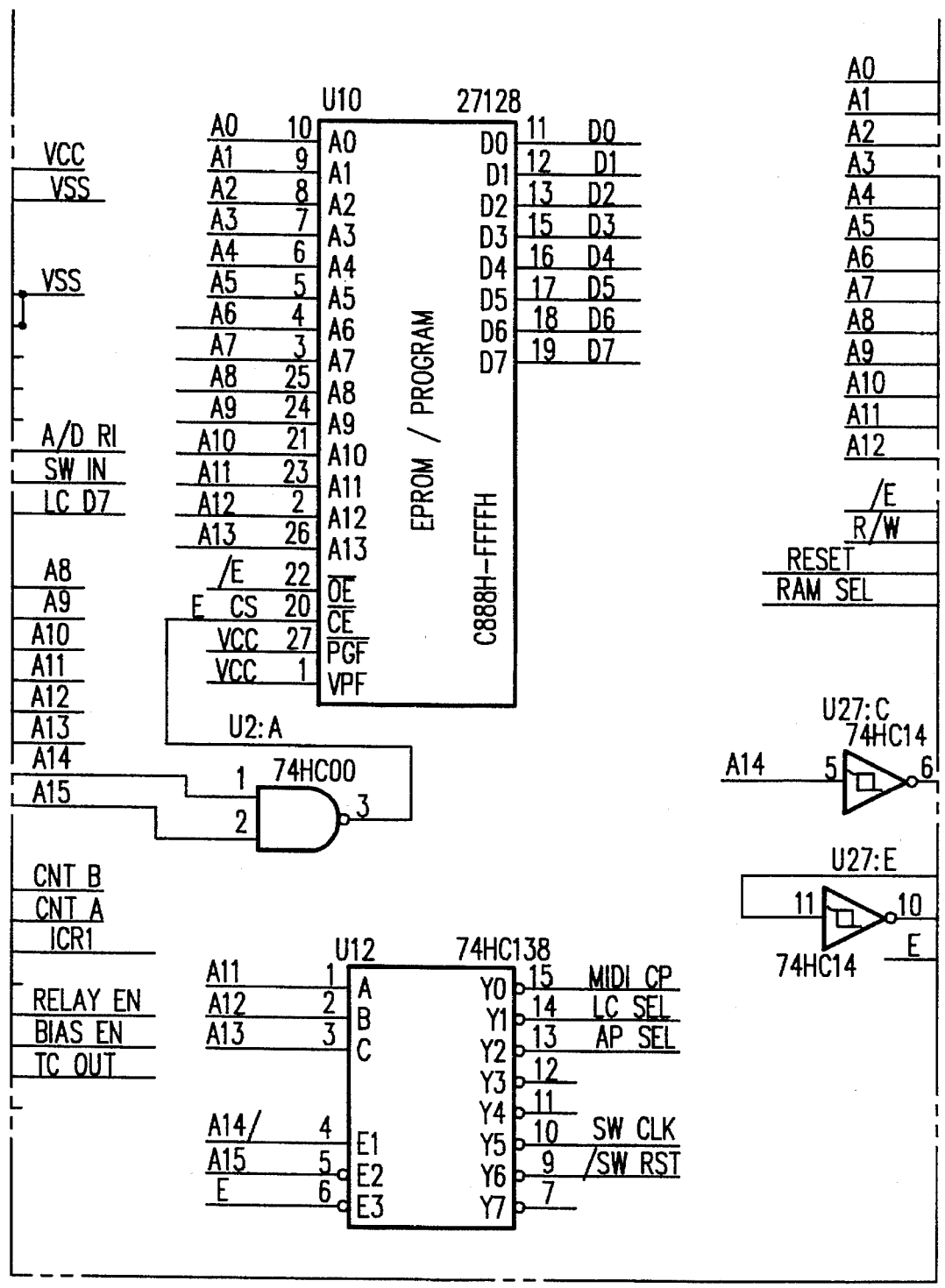
Figure 7D:
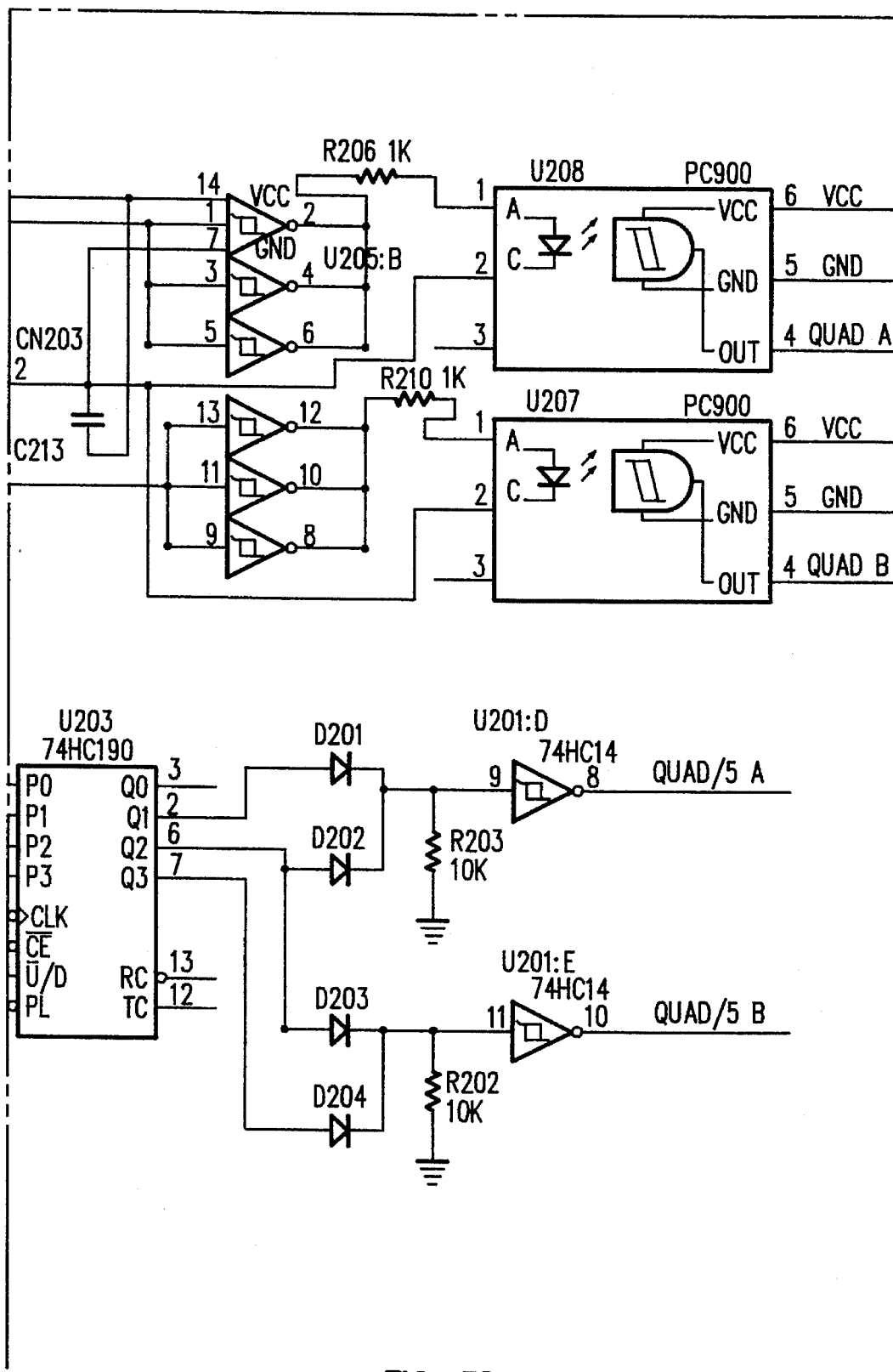
Figure 7E:
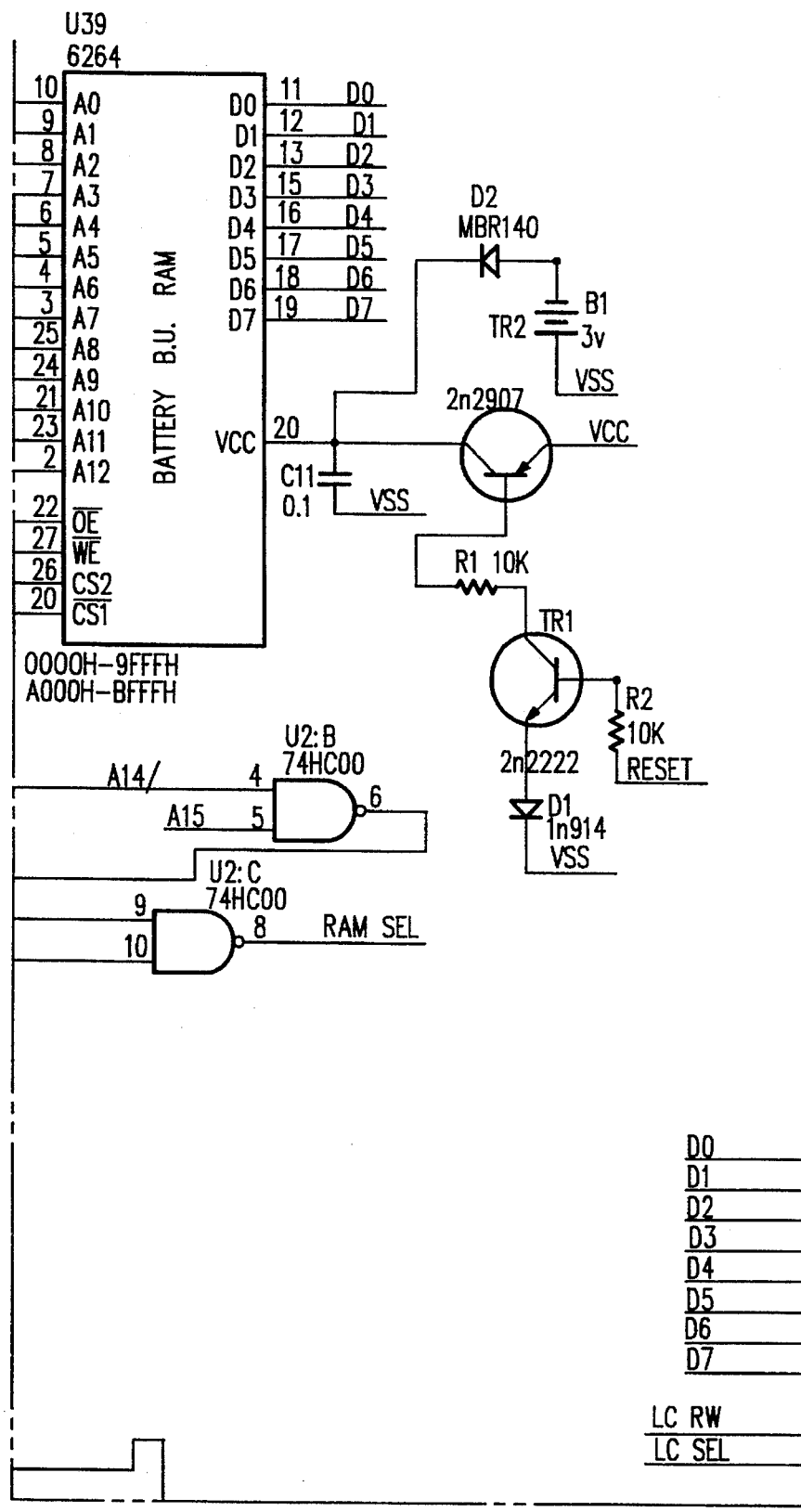
Figure 7F:
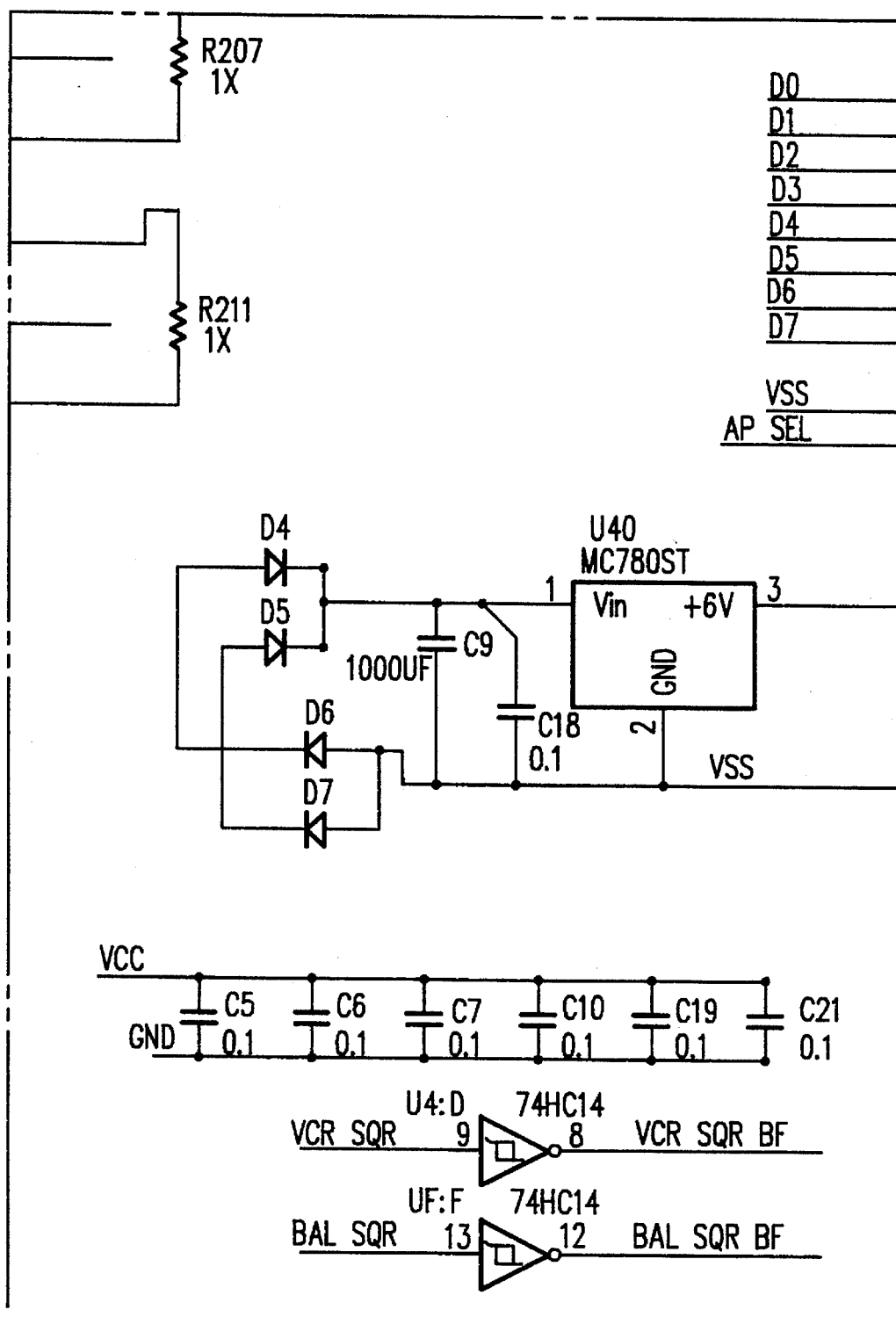
Figure 7G:
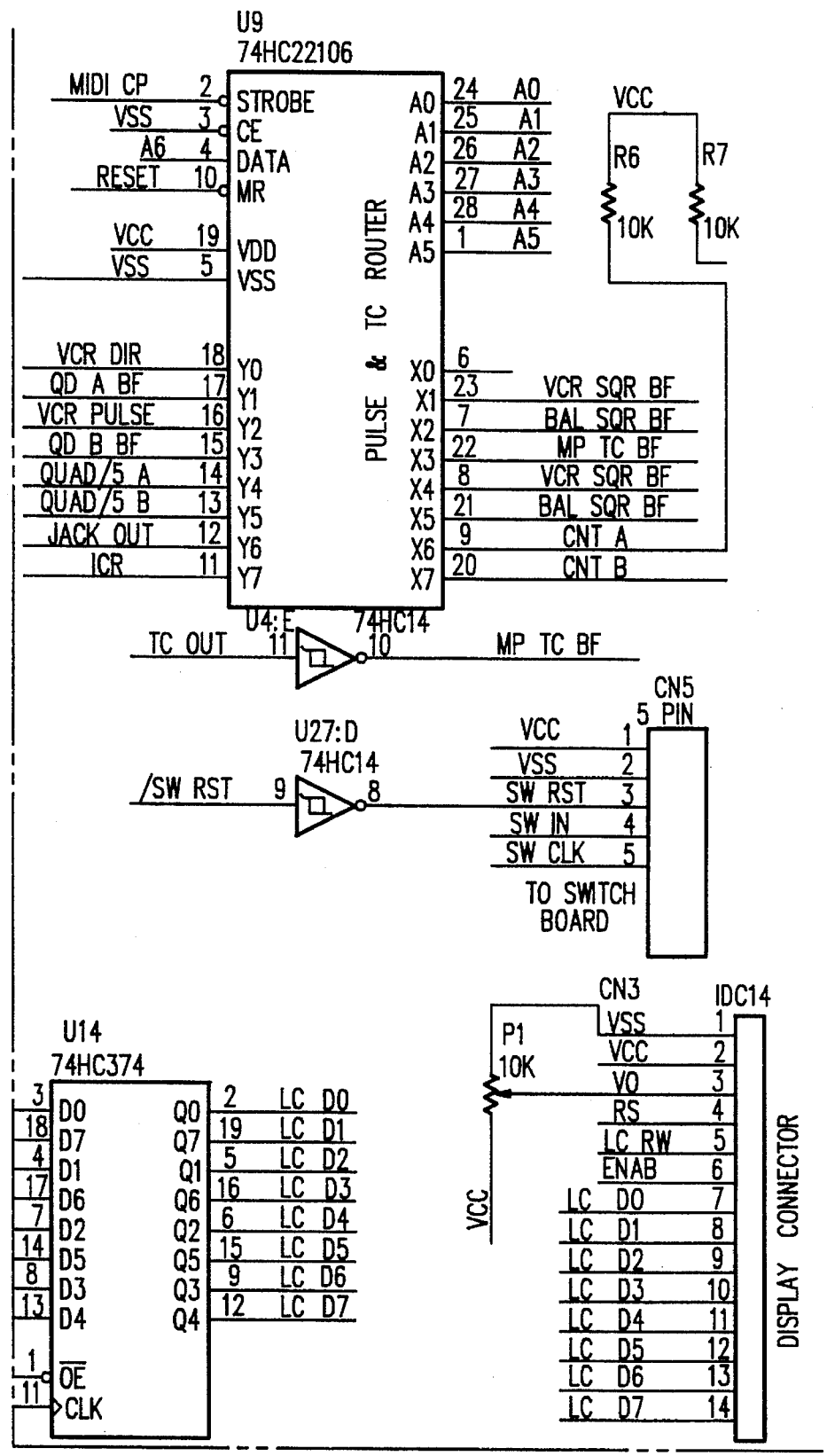
Figure 7H:
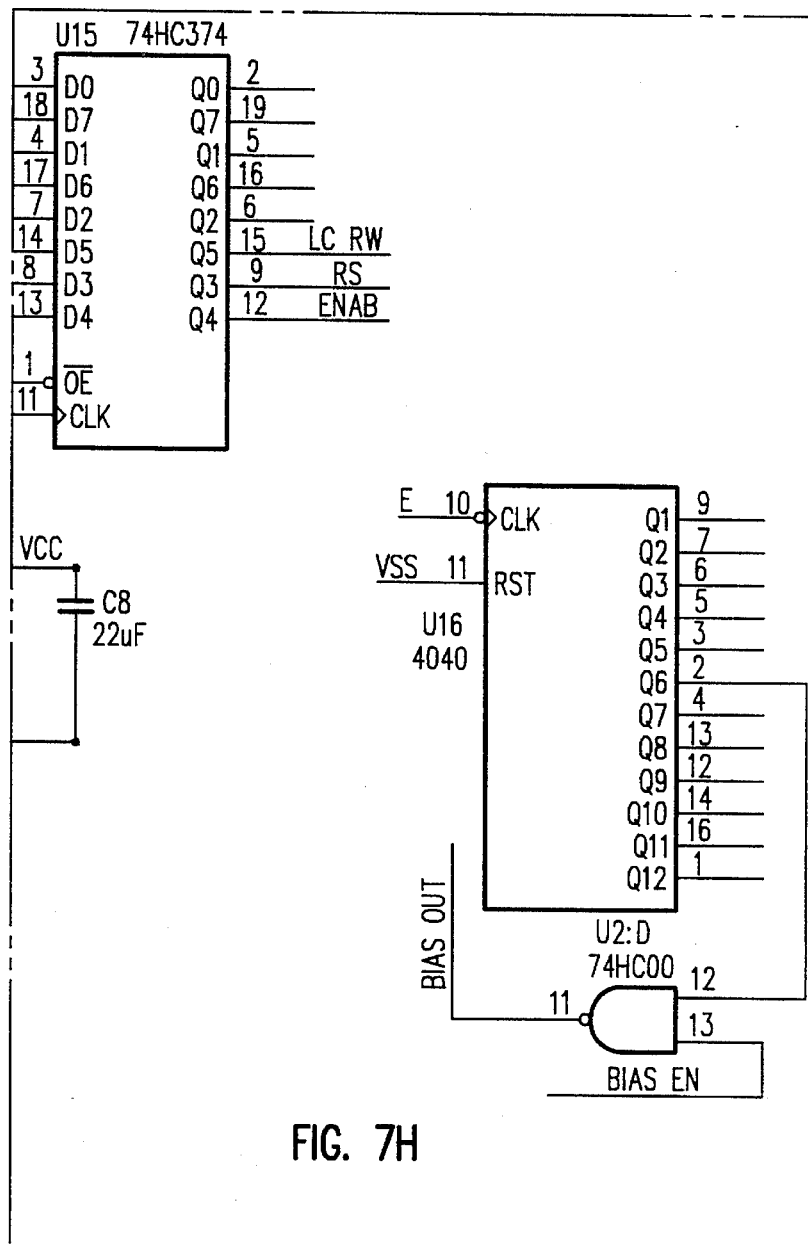
Figure 7H:
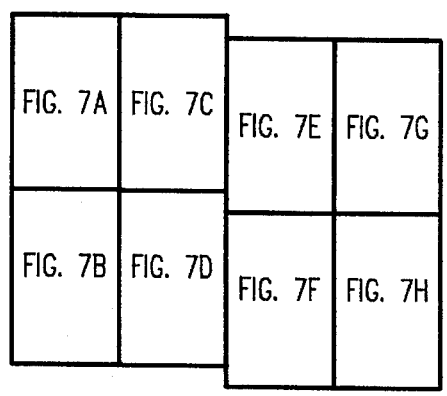

Referring to FIG. 5, a system for editing according to the present invention is shown. System 300 comprises a first pair of reels 301, a second pair of reels 302, a visual image module 303, a display device 304, a speaker 305, a control panel 307, code box 200, optionally inserter 112, optionally video recorder/player 114, flatbed 115, and optionally computer 118.

Track 1 is loaded onto reels 301 and through sound module 100. Film 12 is loaded onto reels 302 and through visual image module 303. As shown in FIG. 3 and FIG. 5, sound module 100 of flatbed 115 is coupled to code box 200 of the present invention, which is optionally coupled to video recorder/player 114. Code box 200 is also optionally coupled to computer 118. After film 12 and track 1 have been loaded and aligned for synchrony onto reels 302 and 301 respectively, an initial code is entered from input means 116. This initial code according to the present invention is described in reference to FIG. 4.

A motor drive associated with flatbed 115, not shown is enabled through control panel 307 for recording code on balance stripe 2 and optionally videotape 400 located in video recorder/player 114.

After recording code on balance stripe 2 and videotape 400, an editor will make required editing cuts. In the process thereof an editor will generate an edit decision list. Video recorder/player 114 optionally includes an inserter 112. Inserters are well-known in the art of the present invention. Moreover, an inserter can be coupled between code box 200 and video recorder/player 114, when not included with video recorder/player 114. The inserted can insert code values according to the present invention as part of the video picture for display on a monitor. An editor uses display device 304 and speaker 305 for viewing and hearing information recorded on film 12 and track 1. A separate monitor 127 is used for viewing videotape addresses or code. Once an edit decision list is complete, locations for directing an editor as to where to cut film 12 and associated track 1 may be given by code of the present invention.

CODE BOX OPERATION

Code, either entered on input means 116 or read from balance stripe 2 or videotape 400, is displayed on display device 117. Display device 117 as is used in the preferred embodiment of the present invention is shown in FIG. 4. Display device 117 contains information relating to associated frames 15 of film 12 with respect to track 1. Frames 15 are referenced to track 1 in order that sound matches up to picture. For example, actor's dialogues must be in synchrony with actual mouth movement.

The first three numbers 201, as exemplified by the numerals 257, indicate a scene number. A fourth digit or letter 201, as exemplified by the letter A, indicates a source code which, as mentioned above, may represent a variety of different information. The next four digits, as exemplified by the numerals 0934, indicate distance (e.g., in feet) from a synchronization mark of film 12 and correspondingly track 1. Two digits 204 indicate the number of frames from last foot mark. For example, 934 feet and an additional four frames is the indicated reference. In 35 mm film there are 16 frames per foot. Thus, the two digits 204 indicate from frames 0–15. Matrix display 205 is for cutting track 1 to a precise position corresponding to an associated frame 15 on film 12 in accordance with an edit decision list. Dashes 208 indicate the four sprocket holes associated with each frame 15 of a segment of film 12.

This precision is based on received quadrature pulses. Line 209 represents the exact placement within ½0th of a frame. This precision is based on received quadrature pulses. Line 209 are given to indicate an exact location for cutting track 1, and correspondingly film 12. While twenty possible locations are available only one line actually shows up in actual display of the preferred embodiment during editing as an indication of position within a frame 15. Moreover, more or less than twenty lines can be used depending on precision required. Thus, line 209 circulates as track 1 is advanced or reversed. Typically, an editor or operator will set line 209 to the middle of a frame 15 when entering an initial code value. Thus, the code of the present invention includes frame numbers and fractions of a frame not previously disclosed in Acmade® code.

The preferred embodiment of the present invention comprises four modes of operation. These modes are defined by switches 206 and 207 and activated by switch 211. Labels 215 and 216 define the switch positions for the user. Switch array 210 is for setting initial code values. The four modes of operation are: 1) initializing the code to a value chosen by an editor; 2) recording the code as it is generated to both balance stripe 2 and optionally to videotape; 3) reading the previously recorded code from videotape; and 4) reading the previously recorded code from balance stripe 2. Shown are RECORD-SET/PLAYBACK switch 206 for sending a signal along path 102 to enable either setting of code or playing code back. READ FILM/READ VCR switch 207 is for reading previously recorded code from either balance stripe 2 or from videotape 400. RECORD switch 211 activates the recording of code as it is generated by controller 103 to balance stripe 2 and optionally videotape 400. It should be understood that videotape recorder/player 114 can be turned on prior to code generation. Optionally, code may be applied to balance stripe 2 and videotape 400 in two separate operations. Setting switch 206 to PLAYBACK and switch 207 to READ VCR allows code box 200 to be able to read code previously recorded on videotape 400, when the video recorder/player 114 is in a mode of operation. Setting switch 206 to PLAYBACK and switch 207 to READ FILM allows code box 200 to be able to read code previously recorded on balance stripe 2 when track 1 is moved through sound module 100.

In the initialize code mode, switch 206 is set to RECORD-SET. In the preferred embodiment, LCD 214 will display SET CODE. Switch array 210 allows an operator to set code values to identify the particular material. For example, after setting switch 206 to RECORD-SET, an operator enters a scene number, a source code and footage value corresponding to an initial start mark on a reel. Also, a frame number and additionally a location within that frame can be entered according to code of the present invention.

Flatbed 115 is run for moving track 1 and optionally film 12. Quadrature pulses from flatbed 115 will then be received to code box 200 to increment or decrement the code displayed on LCD 214. Film 12 is run together with track 1 when recording both to videotape 400. Typically, an operator will rewind about five feet of track to allow sufficient leader for flatbed 115 to get up to recording speed. Typical recording speed is approximately the equivalent of 90 feet of track per second for synchronization with film 12. To activate the record code mode, switch 211 is activated, which causes the code as generated to be applied to balance stripe 2 and, optionally, videotape 400. LED 213 is illuminated during record mode.

After code has been applied to balance stripe 2, the code may be read back with code box 200. Quadrature pulses are used to extrapolate the current position of track 1 within 1/20th of a frame 15, as explained above.

Code pulses from balance stripe 2 are read with sound module 100. Setting switches 206 and 207 causes a signal to be sent from input means 116 to processor 103. Processor 103 is set with switch 206 set to PLAYBACK and switch 207 set to READ FILM. Sound module 100 is enabled for reading code pulses from balance stripe 2 by processor 103 through signal path 111. Processor 103 provides signals to display 117 along path 123 for displaying code values.

LED 212 is toggled to stay on for approximately one second for each valid code read from balance stripe 2. During reading of code from balance stripe 2, LCD 214 will display "READ FILM" along with the last valid code read and any computed offset, i.e., within 1/20th of a frame.

When noise or invalid code is being read from balance stripe 2, a flashing "." appears in LCD 214. In the preferred embodiment, code box 200 is capable of reading from about 3 to 50 frames per second. When related quadrature pulses exceed those values, invalid code is being read. Thus, for example, when track 1 is moved too fast or too slow to be read, a flashing "" will appear in LCD 214.

Moreover, quadrature pulses may be used for error detection and correction. For example, if a code was inadvertently altered, corresponding amounts of quadrature pulses received would indicate that the code is invalid.

ONE-TO-ONE TRACK

As shown, flatbed 115 comprises first pair of reels 302 for film 12, first pair of reels 301 for track 1, control panel 307, display device 304, visual image module 303, sound module 100 and speaker 305. Flatbed 115 also additionally comprises a second pair of reels 308 for film 12, a second visual image module 310, a second display device 309, a second pair of reels 311 for one-to-one track 313 and a second sound module 312. These additional features are typical of a standard eight plate flatbed as known in the art.

In the process of dubbing, as explained elsewhere herein code applied to balance stripe 2 would be lost. Therefore, the present invention teaches recording dialogue and code on balance stripe 2 of one-to-one track 313. One-to-one track 313 is essentially a copy of track 1. One-to-one track 313 is used with sound module 312 and reels 311 in similar fashion as is track 1 with sound module 100 and reels 301. One-to-one track 313 is synchronized with track 1 for similar registration between the tracks. It should be understood that single stripe 3 of one-to-one track 313 may or may not have information recorded thereon, when applying code to balance stripe 2 of one-to-one track 313. However, in the preferred embodiment of the present invention, single stripe 3 of one-to-one track 313 would have information recorded thereon, e.g., dialog, when recording on balance stripe 2 of that track.

After recording code on balance stripe 2 of one-to-one track 313, one-to-one track 313 can be removed to a sound studio for dubbing. As explained elsewhere herein, effects, music and dialogue may all be mixed onto a single track. Dialogue, effects and music are typically mixed onto a full-coat magnetic track. This requires dialogue, effects and music to be aligned with specific frames 15 of film 12. However, prior to the present invention, a sound editor, sound studio engineer, etc., had no method for determining which frames 15 correspond to dialogue other than by trial and error. However, with the present invention, code box 200 may be located at a sound studio for reading code from one-to-one track 313. Because code is applied to balance stripe 2 of one-to-one track 313, that code may be used to precisely dub effects and music in synchrony with dialogue and appropriate film frames 15. Thus, for example, a sound editor could determine exactly which scene, source, and where on a reel of film 12, particular dialogue originated.

Code can be written directly to one-to-one track 13; however, it should be understood that the present invention may be used with a plurality of sound modules. By way of example and not limitation, code may simultaneously be recorded on balance stripe 2 of track 1 and one-to-one track 313.

EDITING WITH VIDEOTAPE

After an edit decision list is created, video recorder/player 114 may be used to play an edited version of a second videotape or videotape with edited segments of film 12 and associated track 1. After viewing an edited videotape, an editor will determine whether an edit decision list is completed. In which case, with a completed edit decision list, actual film 12 and associated track 1 may be edited to conform to the previously edited and "approved" videotape. Track 1 is rewound and loaded onto first pair of sound reels 301, and film 12 is rewound and loaded onto first pair of film reels 302. As previously discussed, film 12 and track 1 are aligned for synchrony. A signal from input means 116 along signal path 102 to controller 103, is sent to cause controller 103 to provide a control signal along signal path 107 for enabling routing device 104. With respect to the preferred embodiment, RECORD-SET/PLAYBACK switch 206 is set to PLAYBACK and READ FILM/READ VCR switch 207 is set to READ VCR.

Referring to FIGS. 3–5 in playback mode, video recorder/player 114 outputs data along signal paths 124 and 128 to code box 200. Data along signal path 128 indicates direction of movement of videotape 400, either forward or reverse. Data along signal path 124 are in the form of code pulses, which can represent code according to the present invention. Code pulses are routed from routing device 104 to controller 103 along signal path 105.

Code box 200 reads code pulses from video recorder/player 114 along path 124. One pulse per video field ("field pulses") provided by some video recorder/players may be used to extrapolate current positions of videotape 400, especially useful when videotape 400 is run at speeds or in directions which exceed the capability of code box 200 for reading code from videotape 400. In the preferred embodiment of the present invention, code box 200 can read valid code from about 3 to 48 film frames 15 per second when reading from videotape 400. Additionally, field pulses are used to determine how fast code is being received to code box 200. In the preferred embodiment, 24 frames per second of code correspond to 60 field pulses per second. Field pulses are used to display current position within a one to two-fifths of a film frame 15. Field pulses are sent from video recorder/player 114 to controller 104 along signal path 125.

As explained with respect to reading from balance stripe 2, a flashing "." appears when invalid code is read. This equally applies to code read from videotape 400. However, rather than quadrature pulses, field pulses are used. Field pulse allow LCD 214 with line 209 to display computed offset with ⅖ths of a frame. Also, field pulses can be used for error correction. Therefore, it should be understood that reading from balance stripe 2 and videotape 400 are similar.

Code stored on videotape 400 will reflect those points in which both film and associated track must be cut according to an edit decision list. Both channels or only one channel of videotape audio can be used to send code data as received along signal path 124. Moreover, some videotapes have more than just two channels; therefore, any channel which can sync dialog to picture may be used.

Additionally, an optional video signal may be fed from video recorder/player 114 along signal path 126 to a monitor 127 to display code inserted by inserter 112 onto videotape 400, which allows an editor to view code with videotape image. As film 12 and associated track 1 are played, they can be displayed on display 304 and can be heard through speaker 305 as is known. Control panel 307 allows an editor to quickly advance film 12 and associated track 1 in a synchronous manner while viewing code, as displayed, for example, on output means 117, or optional monitor 127. When an editor locates an edit decision point, i.e. a point where track 1 is to be cut and associated film 12 is to be cut, he or she stops movement of associated track 1 and film 12. Additionally, control panel 307 allows for minor, i.e., slower movements, as is known in the art. Thus, as is known in the art, control panel 307 allows track 1 and film 12 to be moved forward or reverse at varying degrees of speed. In this manner, an editor can precisely determine the points at which film 12 and associated track 1 need to be cut. As is known in the art of the present invention, it is common to mark these positions with a black marking pen, and proceed to the next edit point. Upon completion, a series of points for cutting track 12 and associated track 1 will be created upon which film 12 and track 1 can be cut and various portions thereof spliced together for creating reels, approximately 10 minutes long or less, each with an Academy leader. The Academy leader includes a visual "BEEP" frame for synchronizing sound to picture. These reels are used in producing what is known in the art as a public release copy.

Figure 8A:
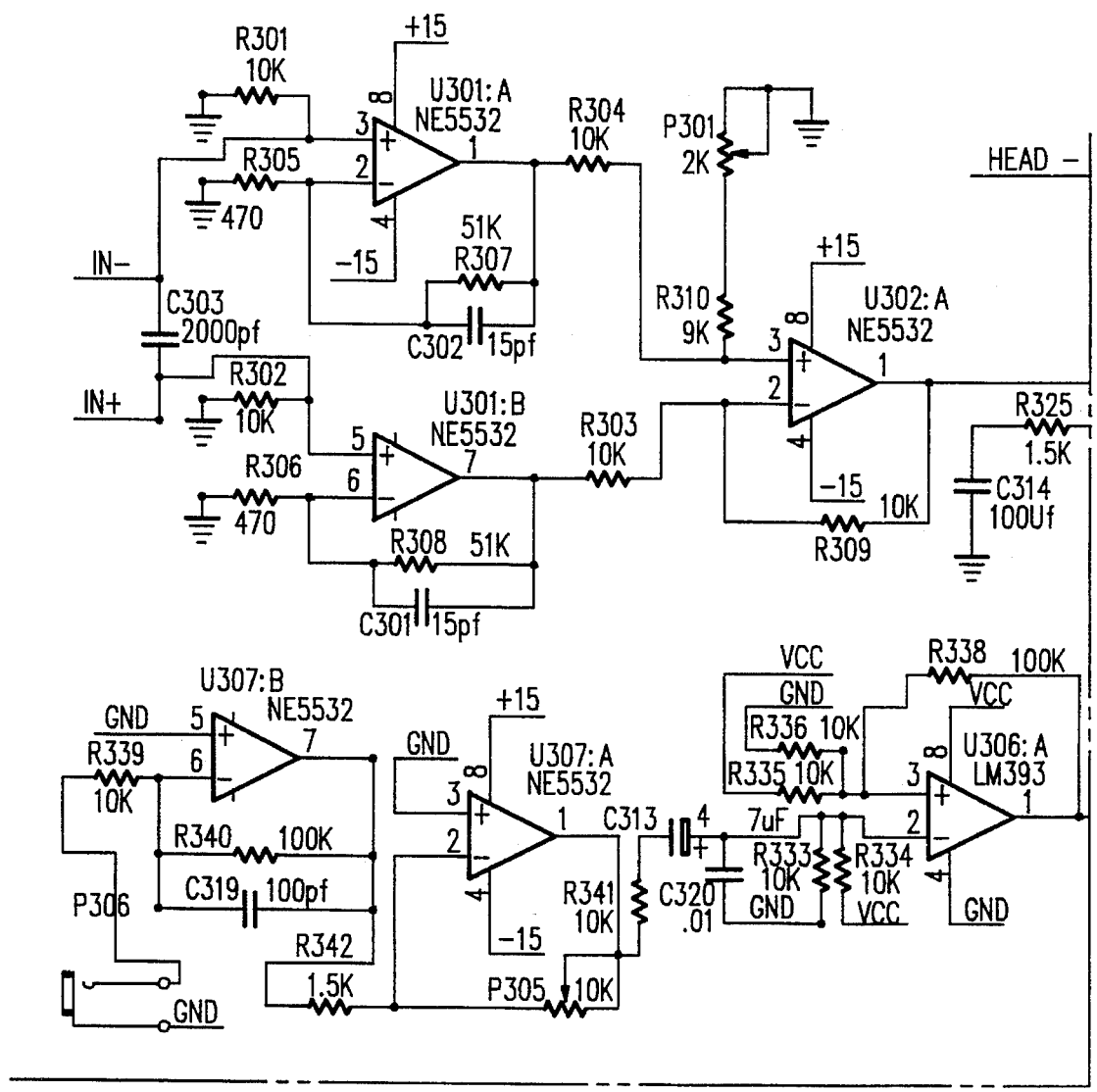
Figure 8B:
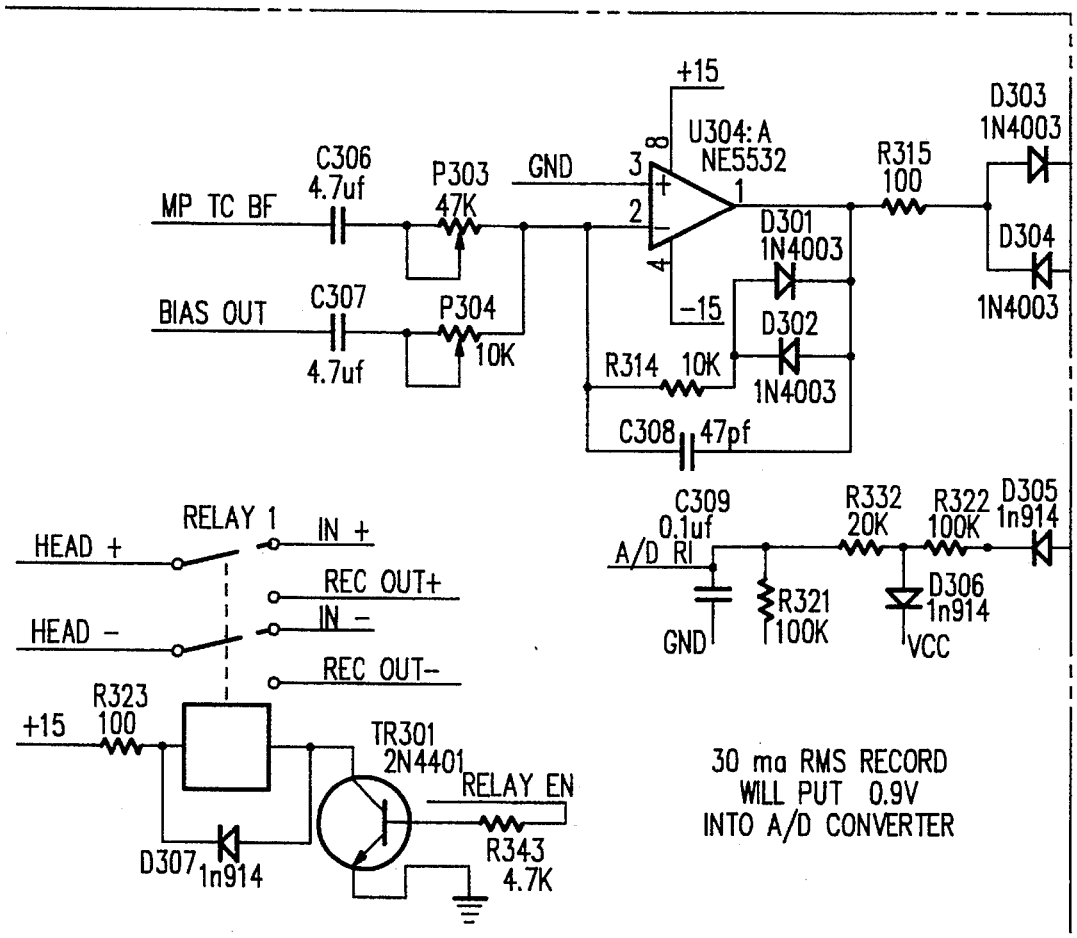
Figure 8C:
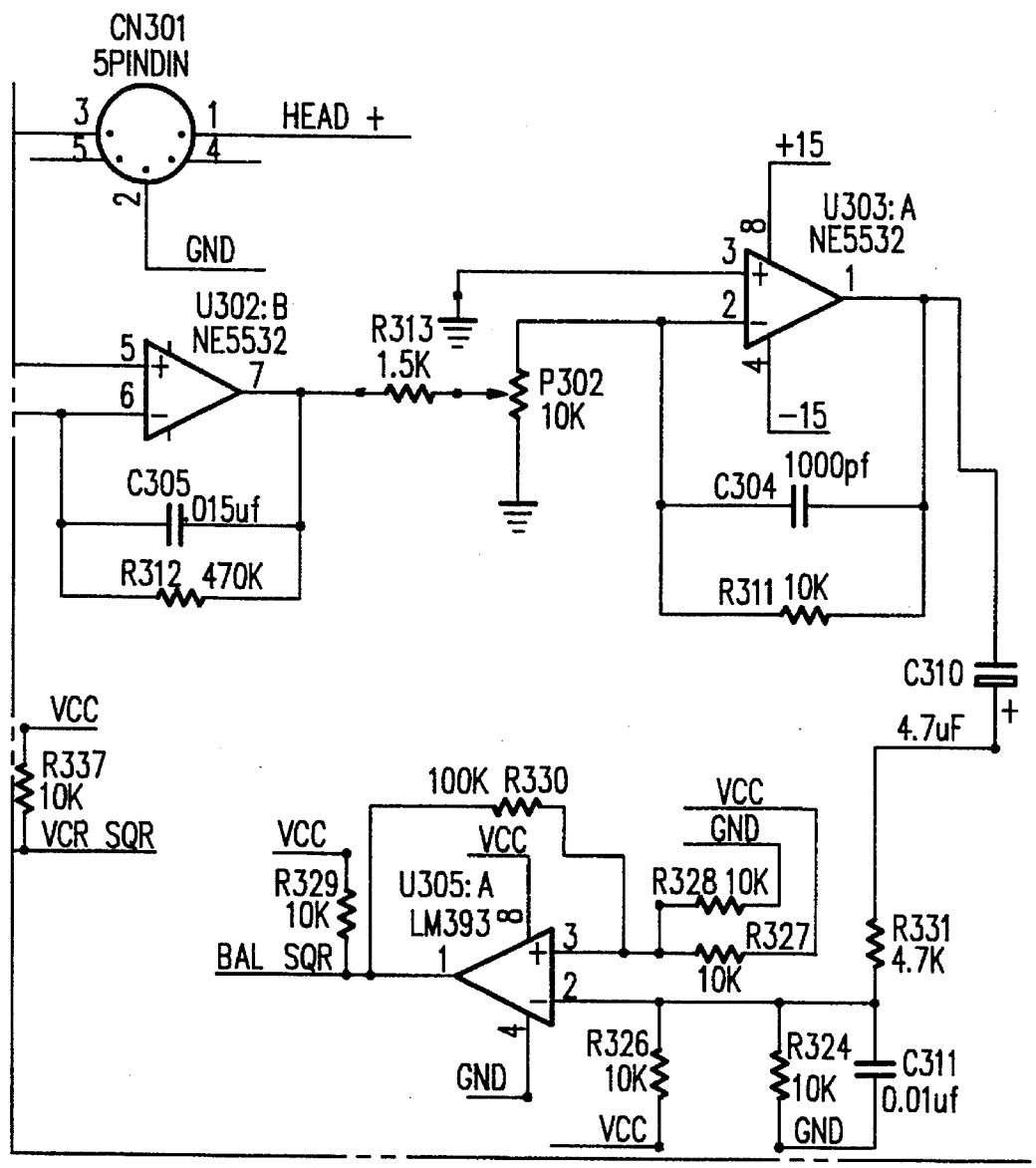

A working model according to the present invention with respect to code box 200 was constructed. FIGS. 7 and 8 are schematic diagrams for a working model of code box 200 according to the present invention.

The present invention has been particularly shown and described with respect to certain preferred embodiments of features thereof. However, it should be readily apparent to those of ordinary skill in the art that various changes and modifications in form and detail may be made without departing from the spirit and scope of the invention as set forth in the appended claims. The invention illustratively disclosed herein may be practiced without any element which is not specifically disclosed herein.

What is claimed is:

1. A method of applying encoded data on a balance stripe of a sound track media, said sound track media having at least said balance stripe and a single stripe, the single stripe for sound information, said method comprising the steps of:

transmitting said encoded data to a transducer, said encoded data relating to positioning of said sound track media relative to frames of a separate associated film media, said encoded data providing information for editing said associated film media without recording said encoded data on said associated film media;

passing at least a portion of said balance stripe in close proximity to said transducer; and applying said encoded data to said balance stripe through use of said transducer.

2. A method, as recited in claim 1, wherein said transducer applies said encoded data to said balance stripe electromagnetically.

3. A method, as recited in claim 1, wherein said encoded data is position data based on distance from a synchronization mark.

4. A method, as recited in claim 1, wherein said encoded data is related to synchronization of said sound track media with respect to said associated film media.

5. A method, as recited in claim 1, further comprising the step of reading said encoded data applied from said balance stripe through use of said transducer.

6. In a recording device having a first transducer for reading audio data from a single stripe of sound track media, an apparatus for applying code related to said audio data to a balance stripe of said sound track media, said sound track media not including associated picture frames, said apparatus comprising:

a second transducer, coupled to said recording device, for applying said code to said balance stripe;

said code being encoded data relating to positioning of said sound track media relative to said associated picture frames, said encoded data providing information for editing said associated picture frames without recording said encoded data on said associated film media.

7. Apparatus, as recited in claim 6, wherein said second transducer is further for reading said code from said balance stripe.

8. Apparatus, as recited in claim 7, further comprising a third transducer, coupled to said recording device, for erasing said code from said balance stripe.

9. Apparatus, as recited in claim 8, wherein said second transducer is proximally located near and in vertical parallel with said first transducer.

10. Apparatus, as recited in claim 9, wherein said third transducer is proximally located near and in horizontal parallel with said second transducer.

11. A system for applying code onto a balance stripe of a sound track media, the code for synchronizing sound on a single stripe of the sound track media to film media, said sound track media not including associated picture frames of the film, the system comprising:

- a code box for generating the code, the code being encoded data related to position of the film media to the sound track media, the encoded data providing information for editing the film media without recording the encoded data on the film media;
- a sound module coupled to the code box for receiving the code and for applying the code to the balance stripe on the sound track media; and
- a flatbed coupled to the code box for providing pulses to the code box, the pulses related to movement of the sound track media for generating and applying the code to the balance stripe.

12. A system, as recited in claim 11, further comprising a video recorder coupled to the code box for receiving the code, the video recorder including a videotape for recording the code received onto the videotape.

13. A system, as recited in claim 12, wherein the code is recorded onto a channel of the videotape.

14. A system, as recited in claim 12, further comprising an inserter coupled to the code box for receiving the code, the inserter further coupled to the video recorder for applying the code in the form of a video signal onto the videotape.

15. A system, as recited in claim 12, further comprising a computer coupled to the code box for receiving the code.

* * * * *